United States Patent Office 3,598,519
Patented Aug. 10, 1971

3,598,519
PURIFICATION OF MOLYBDENUM
Vincent Chiola, Towanda, Phyllis R. Dodds, Wysox, John A, Powers, New Albany, and Clarence D. Vanderpool, Towanda, Pa., assignors to Sylvania Electric Products Inc.
Filed June 30, 1969, Ser. No. 837,777
Int. Cl. C22b 59/00
U.S. Cl. 23—22        4 Claims

ABSTRACT OF THE DISCLOSURE

A process for separating molybdenum values from various impurities is disclosed. The process comprises dissolving a contaminated molybdenum source in an aqueous sulfuric acid solution to form an aqueous acidic feed solution, contacting the feed solution with a water-insoluble organic evtractant solution comprising a tertiary alkyl amine and a water-insoluble hydyrocarbon solvent, thereby selectively extracting the molybdenum values into said organic solution and stripping the organic solution with an aqueous strip solution containing ammonium ions and ammonium molybdate to thereby form an aqueous ammonium molybdate solution and thereafter separating said molybrate solution from said organic extractant solution.

BACKGROUND OF THE INVENTION

This invention relates to the recovery and purification of molybdenum from an aqueous acidic molybdate solution containing impurities. More particularly, it relates to producing molybdenum from impure forms such as molybdenite ore or technical grade molybdenum oxide.

Ammoniacal molybdenum solutions are customarily derived by a process which starts by roasting molybdenum-bearing ores to obtain technical-grade $MoO_3$. The technical-grade $MoO_3$, generally containing from about 10 to about 15% of $SiO_2$, is then sublimed to yield "pure" $MoO_3$ containing about 1% impurities. The $MoO_3$ is digested in hot $NH_4OH$ either at atmospheric or elevated pressure and a highly pure ammonium paramolybdate (greater than about 99.5% purity) is recovered by crystallization.

An alternative method recently introduced involves leaching molybdenum oxide-containing ores at 60° C. in the presence of $SO_2+H_2SO_4$ to extract the molybdenum followed by air-oxidizing to prepare the molybdenum for adsorption on activated charcoal. The molybdenum-loaded charcoal is placed in stripping columns where air and ammonia are introduced to produce soluble ammonium molybdate. An evaporator-crystallizer then produces molybdic acid and ammonium paramolybdate.

The ammonium paramolybdate can be converted to pure oxide which meets purity requirements for pressing and sintering, electrodes, sheet and plate, wire products, etc.

Recently, V. Kunda (U.S. Pat. 3,196,004), S. R. Zimmerly, et al. (U.S. Pat. 3,314,783), and M. E. Messner, et al (U.S. Pat. 3,376,104) describe processes for obtaining pure molybdenum products from molybdenite ore concentrates. The processes generally involve roasting, leaching, filtrating, oxidizing, drying, and/or precipitating steps to obtain the final ammonium paramolybdate product.

The heretofore known stepwise processes proceed from molybdenite ore concentrate to ammonium molybdate solution by (1) roasting to technical-grade oxide, (2) sublimation to pure-grade molybdenum oxide, (3) dissolution in ammonium hydroxide to ammonium molybdate solution. High-purity ammonium paramolybdate crystals are then recovered by crystallization.

These types of processes suffer from one or more of the following disadvantages:

(a) they are stepwise methods involving batch material handling;
(b) $SO_2$ is given off as a by-product of converting molybdenum ore concentrate to $MoO_3$, thus causing a pollution or recovery problem;
(c) copper and alkali metal impurities are not removed during processing;
d) additional processing for removal of copper and alkali are costly, time-consuming and reduce molybdenum recovery;
(e) overall recovery of molybdenum is relatively low;
(f) mother liquor generated by crystallization requires recycling to reclaim molybdenum;
(g) crystallization is the only means of obtaining high-purity ammonium molybdate due to the impurities (Cu, K, Na) present in ammonium molybdate solution;
(h) the dissolution of technical-grade $MoO_3$ in $NH_4OH$ is at most about 95% efficient.

The charcoal adsorption process, while overcoming some of the disadvantages of the convention stepwise processes, has the following disadvantages:

(a) at most about a 95% molybdenum recovery is achieved;
(b) elevated temperature and vacuum are required and must be carefully controlled;
(c) sulfur must be bled from the evaporator and some molybdenum is recycled;
(d) the $(NH_4)_2MoO_4$ solution is very dilute and must be concentrated by evaporation before ammonium paramolybdate can be crystallized.

It will be readily appreciated that while carbon adsorption overcomes some of the disadvantages of the conventional molybdenum processes, it has a major disadvantage because the dilute ammonium molybdate solution [70 g./l. $(NH_4)_2MoO_4$] necessitates physical plants having higher capacity, larger equipment, thus a higher investment is necessary in order to achieve production rates which are comparable to the conventional processes or to the process of this invention.

In co-pending patent application Ser. No. 837,775 filed concurrently herewith, a process is disclosed that overcomes many of the disadvantages of the prior art processes. In the system utilized in co-pending patent application Ser. No. 837,775, a three-component organic extractant system is used to extract molybdenum values from a solution that is formed via caustic digestion followed by adjusting the resulting solution to a pH of about 2. The present process offers many of the advantages of those in the above co-pending application and in addition eliminates the need to use a solubilizer as a portion of the organic extractant solution, thereby enabling less stringent temperature and pH control. For example, the low pH that is necessary in the present process tends to degrade the solubilizer and emulsions can be formed. Additionally, the process of this invention enables extraction of molybdenum directly from an acid solution at low pH's that are generated by the digestion of a molybdenum source in acid.

It is believed, therefore, that a two-component solvent extraction process that produces an ammonium molybdate solution relatively free of the impurities normally found in ores and in technical-grade molybdenum oxide, that is highly efficient and capable of being used as a continuous process, is an advancement in the art.

SUMMARY OF THE INVENTION

In accordance with one aspect of this invention, there is provided a method for separating molybdenum values from impurities. The process comprises:

(a) Dissolving a molybdenum source contaminated with certain impurities in an aqueous sulfuric acid solution to thereby form a molybdenum-containing feed solution having a pH below about 0.5;

(b) Contacting said feed solution with a water-insoluble organic extractant solution comprising a tertiary alkyl amine and a water-insoluble aromatic hydrocarbon solvent for said amine, to thereby selectively extract at least a portion of said molybdenum values into said organic solution;

(c) Separating the resulting organic and aqueous solutions;

(d) Contacting the resulting molybdenum-pregnant organic solution with an aqueous solution containing ammonium ions and ammonium molybdate, to thereby form an aqueous ammonium molybdate solution; and (e) Separating said aqueous ammonium molybdate solution from said organic solution.

BRIEF DESCRIPTION OF THE DRAWINGS

FIG. 1A is the extraction circuit and FIG. 1B is the stripping circuit.

Figure 1A:
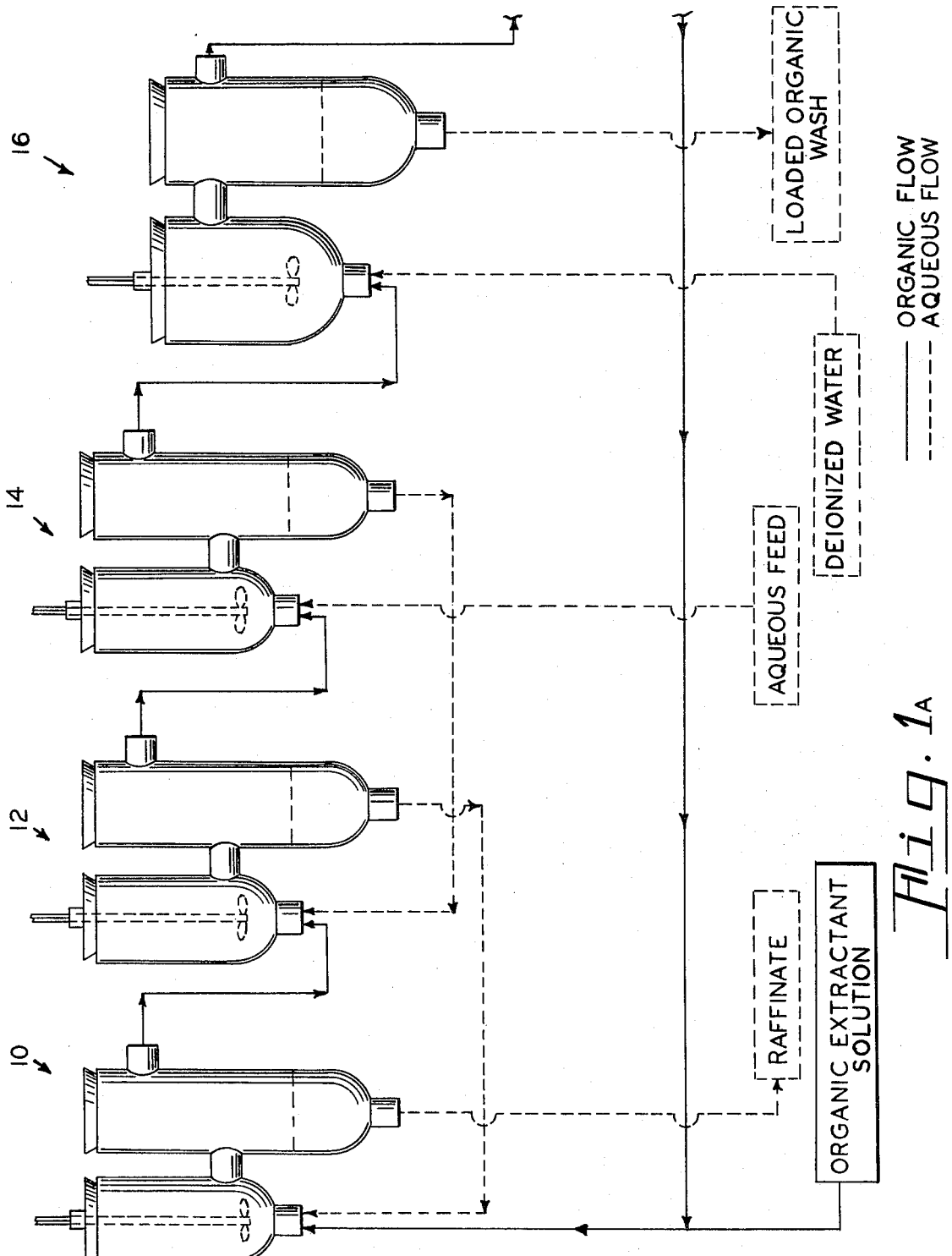
FIGS. 1A and 1B are a flow sheet of a process utilized in the practice of this invention.

For a better understanding of the present invention, together with other and further objects, advantages and capabilities thereof, reference is made to the following disclosure and appended claims in connection with the above description of some of the aspects of the invention and the brief description of the drawings.

DESCRIPTION OF THE PREFERRED EMBODIMENTS

In the practice of one aspect of the present invention, a feed solution is prepared from an impure $MoO_3$ by slurrying in $H_2SO_4$ and digesting for about five hours at 240° C. to obtain dissolution of the $MoO_3$.

The mixture is cooled and diluted with water in the digestion vessel and filtered. The filtrate, containing at least about 99% of the Mo present in the starting technical-grade molybdenum oxide and having a pH of less than about 0.5 is used as the aqueous feed in a solvent extraction process wherein it is contacted with a mixture of a tertiary amine in a hydrocarbon diluent using a three-stage mixer-settler extraction unit. The raffinate or molybdenum-barren solution generally contains less than about 0.2 g. $MoO_3$/liter. The molybdenum-loaded organic solution is washed with deionized water and contacted with ammonia-gas-fortified $(NH_4)_2MoO_4$ in a three-stage mixer-settler stripping unit. The aqueous solution is collected as high-purity ammonium molybdate solution containing about 250 to about 290 g. $MoO_3$/liter. The regenerated organic is washed with deionized water and then contacted with about a 3 N $H_2SO_4$ solution before being recycled to the extraction circuit.

Although the volumetric ratio of the amine to the hydrocarbon solvent in the extractant solution can be varied to a considerable extent, such as from about 1:100 to about 100:1, and some of the benefits of this invention can be achieved, volumetric ratios of from about 5:95 to about 30:70 are preferred because of practical operating reasons. For example, use of more than about 30% by volume of amine results in high-viscosities, thus creating handling and agitation problems. Use of less than about 5% by volume of amine increases the number of stages and requires larger volumes of materials to be handled without any appreciable benefits. The especially preferred ratios of the amine to solvent is from about 10:90 to about 25:75.

Examples of suitable amine extractants are the commercially available tricapryl amines, Alamine 336 (made by General Mills, Inc.) and Adogen 364 (made by Archer-Daniels-Midland, Inc.). Other amines, such as tri-isooctylamine and tri-isodecylamine, that are relatively insoluble in water, but capable of forming hydrocarbon-soluble molybdenum complexes can also be used. The hydrocarbon can be a water-insoluble hydrocarbon having predominantly high aromatic content such as S.C. No. 28 (as supplied by Buffalo Solvents and Chemical Corporation). High flash naphtha, benzene and toluene can also be used. By water-insoluble it is meant that less than about 5 grams of the hydrocarbon will dissolve in 100 cc. of water at 25° C.

The volumetric ratio of the aqueous feed solution to the organic extractant solution (amine+hydrocarbon solvent) is from about 5:1 to about 1:2 with ratios from about 3:1 to about 1:1 being preferred. Although the relative amount of the organic extractant solution to the aqueous feed solution can be increased above the 1:2 aqueous to organic ratio, and some of the benefits can be achieved, it is inefficient due to the large recycle operation. Use of ratios wherein the aqueous feed solution is in excess of a 5:1 aqueous to organic ratio can result in processing and emulsion problems.

Extraction and stripping operations are preferably carried out in the temperature range 35–45° C. for optimum solution dispersion, disengagement and settling characteristics, although higher and lower temperatures can be used and the benefits of this invention are achieved.

$H_2SO_4$ is typically chosen for the digestion because of economics and relative ease of handling, although other mineral acids can be used such as HCl, $HNO_3$ and the like. Raw material digestions can be carried out in glass-lined equipment to minimize corrosion problems, and with greater than 99% efficiency. In contrast, the process using digestion in sodium hydroxide or ammonium hydroxide usually results in a maximum of about 95% recovery of molybdenum. Additionally, the silicates, if present, can be carried over into the aqueous feed stream. With sulfuric acid digestion, the undigested residue is mainly $SiO_2$ that contains less than about 1.0% molybdenum and can be separated efficiently by filtration. The pH of the feed is below about 0.5 to insure the formation of extractable molybdenum sulfate complexes and ions. Higher pH's can result in the formation of other molybdenum complexes and ions and water-soluble silicon or silicate species.

Suitable molybdenyl sulfate feed solutions for solvent extraction recovery can also be prepared by digesting water-milled molybdenite ore concentrate in sulfuric acid. For example, a wet cake of molybdenite weighing 340 g. and containing 220 g. of molybdenite concentrate, equivalent to 100 g. Mo, is slurried in 2000 ml. of 98% sulfuric acid. The black slurry is heated to about 325° C. for about 3–4 hours until a color change to light gray occurs and the volume is reduced by about ⅔. After cooling, the solution is filtered through an appropriate media and the sludge is washed free of molybdenum, as indicated by it being free of a blue color. The sludge contains less than about 1% Mo after drying. A feed solution containing approximately 100 g. $MoO_3$/liter is obtained for subsequent extraction processing. Total digestion efficiency on a Mo basis is greater than about 99%.

In order to more fully illustrate the present invention, the following non-limiting example is presented. All parts proportions and percentages are by weight unless otherwise given.

Example 1

About 1000 grams technical-grade $MoO_3$ are slurried in about 1000 ml. $H_2SO_4$ and digested for about 5 hours at 240° C. with constant agitation, after which the solids, primarily $SiO_2$, are allowed to settle. The solution is diluted to about 4000 ml. with deionized water and about 100 ml. $H_2O_2$ is added to oxidize the molybdenum blue, to give a green colored solution after filtration. The undigested residue, mainly $SiO_2$, is found to contain less than about 1.0% molybdenum. The filtrate containing molybdenyl sulfate is used as the aqueous feed in the solvent extraction process.

Figure 1B:
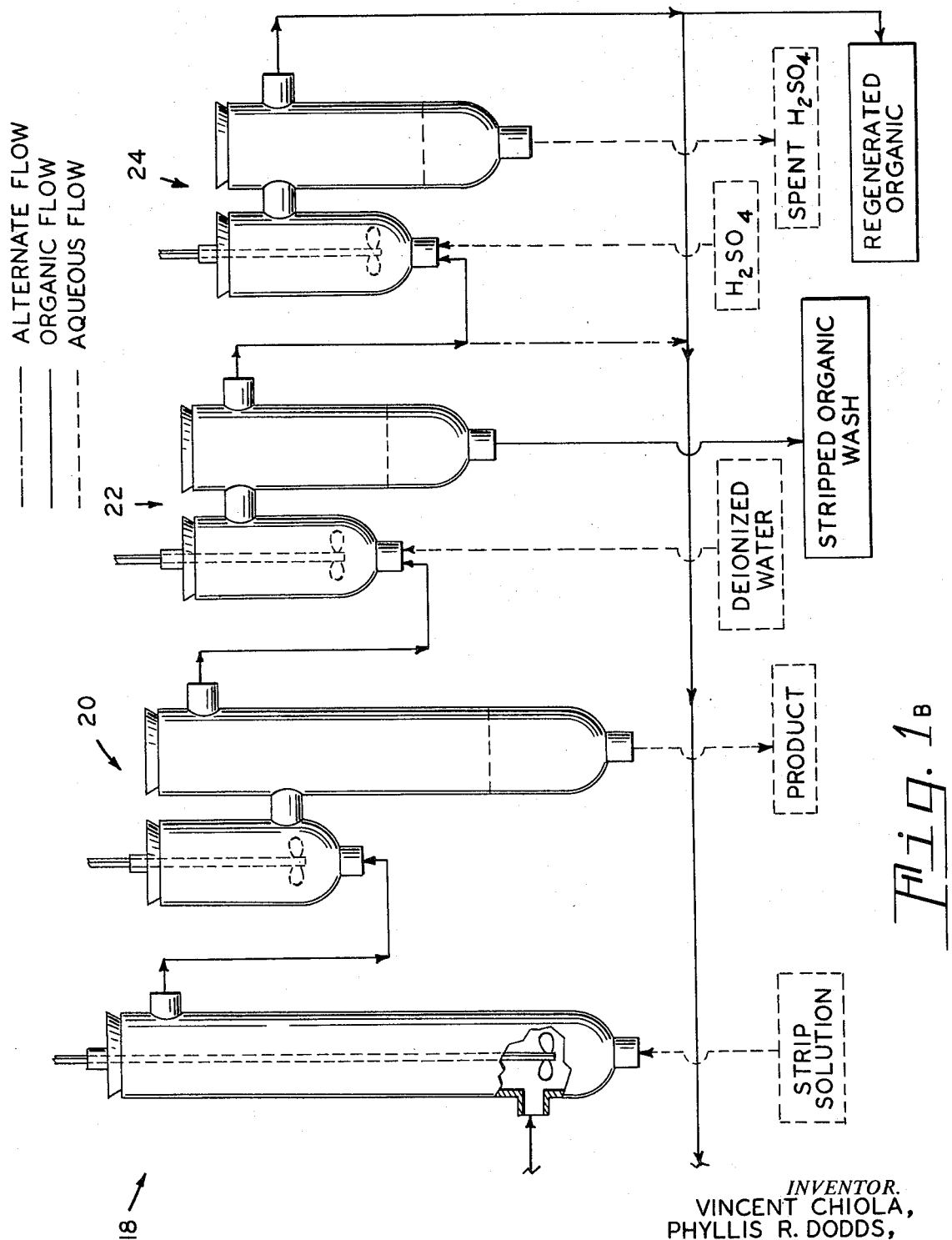

In particular reference to FIG. 1A to FIG. 1B, a flow sheet of a typical production unit is given in which the full extraction circuit, FIG. 1A, consists of three stages, 10, 12 and 14, and a wash or scrub stage 16. In particular reference to FIG. 1B, the complete stripping circuit contains a stripping column-contactor 18, followed by a mixer-settler 20, a wash stage 22, and an organic regeneration stage 24.

In a typical example, in the extraction circuit, aqueous molybdenyl sulfate solution, at +0.1 pH and a concentration of about 119 g. $MoO_3$/liter, is fed to the mixing compartment of the third extraction stage 14 at a rate of about 6 ml./min. and continues to flow to the second extraction stage 12 and the first extraction stage 10. At the same time, barron or unloaded organic extractant (25% amine and 75% high aromatic content hydrocarbon) is fed to the mixing compartment of the first extraction stage 10 at a rate of 9 ml./min. The organic extraction solution flows countercurrently to aqueous feed flow, i.e. from stage 10 to stage 12 to stage 14 while progressively extracting and loading molybdenum at each stage until it reaches maximum or other desirable loading at stage 14. The aqueous feed solution, while traveling countercurrently to organic extractant from stage 14 to 10, becomes progressively depleted of molybdenum. A molybdenum-barren solution or raffinate is discharged from the settling section and typically contains less than about 0.3 g. $MoO_3$/liter and can range to less than about 0.1 g. $MoO_3$/liter. Loaded organic extractant from the settling section of stage 14 is fed to the mixing section of a scrub stage 16, for washing with deionized water to reduce entrained water-soluble impurities. Feed to this stage is at the rate of about 11 ml./min. In the stripping circuit, the scrubbed, loaded-organic solution flows to a columnar contractor stripper 18 where it is contracted in concurrent flow with stripping solution which is being fed at a rate of 2.3 ml./min. The stripping solution consists of a relatively dilute ammonium molybdate solution containing about 45 g. $MoO_3$/liter and a source of ammonium ions derived by adding ammonia gas to the solution until a pH of about 10.8 is reached. Upon initial contact of loaded organic with stripping solution, there occurs some precipitation of a white, molybdenum-containing compound, which on rising through the column stripper redissolves before reaching the settler stage 20. Stripped organic from the settler stage 20 flows to a wash stage 22 where it is scrubbed free of entrained ammonium molybdate. Scrub water (deionized) is fed to the mixer portion of wash stage 22 at 12 ml./min. In a final stage 24, the stripped and washed organic is regenerated or reconstituted for recycling to the extraction stage 10 by contacting the organic with a dilute sulfuric acid solution 1.5 M at a feed rate of 8 ml./min. (Regeneration of the organic involves conversion of the amine component of the organic extract to a sulfate or bisulfate form.) In operation, water from the loaded-organic scrub stage 16 is cycled for dilution of sulfuric acid used in regeneration of stripped organic and wash water from the stripped organic wash stage 22, is cycled to dilute a portion of the ammonium molybdate product solution to make the starting stripping solution before it is gassed with ammonia. An ammonium molybdate product is obtained from the settler 20 as a concentrated solution containing a molybdenum content of about 256 g./liter, $MoO_3$ basis. The above laboratory scale data can be scaled up to the desired production scale by those skilled in the art.

In some instances it is not necessary to regenerate the organic extractant phase by the use of sulfuric acid. In these instances, the washing step that follows the stripping step will be sufficient to yield an organic extractant phase that is of sufficient purity to allow recycle to the extraction stage. Determination of whether a sulfuric acid treatment is necessary can be made by analysis of the raffinate for its molybdenum content. If losses are excessive, that is above about 0.5% of the molybdenum charged to the extraction stage, then a sulfuric acid treatment step will generally be beneficial.

While there has been shown and described what is at present considered the preferred embodiments of the invention, it will be obvious to those skilled in the art that various changes and modifications may be made without departing from the scope of the invention as defined by the appended claims.

We claim:
1. A process for separating molybdenum values from impurities, said process comprising:
   (a) dissolving a molybdenum source contaminated with at least one impurity selected from the group consisting of silica, copper, alkali metals, iron, sulfides and mixtures thereof, in an aqueous sulfuric acid solution to thereby form a molybdenum containing feed solution having a pH of less than about 0.5;
   (b) contacting said feed solution with a water-insoluble organic extractant solution comprising a tertiary alkyl amine and a water-insoluble aromatic hydrocarbon solvent, the ratio of said amiine to said hydrocarbon being from about 5:9 to about 30:70 and said hydrocarbon has a high aromatic content to extract at least some of said molybdenum values into said organic solution, the vulumetric ratio of said feed solution to said organic extractant solution being from about 5:1 to about 1:2;
   (c) separating said organic and aqueous solutions;
   (d) contacting the resultant molybdenum-pregnant organic solution with an aqueous stripping solution having a pH of about 10.8 and containing ammonium ions and ammonium molybdate to remove at least some of said molybdenum from said organic solution and to form an aqueous ammonium molybdate solution; and
   (e) separating said aqueous ammonium molybdate solution from said organic solution.

2. A process according to claim 1 wherein said process is a continuous process.

3. A process according to clam 2 wherein said organic phase after being contacted with said stripping solution, said organic solution is washed with water and is recycled.

4. A process according to claim 3 wherein said organic solution is treated with sulfuric acid prior to recycling.

References Cited
UNITED STATES PATENTS

| | | | |
|---|---|---|---|
| 3,223,476 | 12/1965 | Hart | 23—19X |
| 3,450,639 | 6/1969 | Maria et al. | 23—(312ME) |
| 3,455,677 | 7/1969 | Litz | 23—24X |
| 3,458,277 | 7/1969 | Platzki et al. | 23—22 |

HERBERT T. CARTER, Primary Examiner

U.S. Cl. X.R.

23—23, 24, 51, 312